United States Patent
Tsukamoto

(10) Patent No.: US 9,937,809 B2
(45) Date of Patent: Apr. 10, 2018

(54) PARKING ASSISTANCE DEVICE

(71) Applicant: NISSAN MOTOR CO., LTD., Yokohama-shi, Kanagawa (JP)

(72) Inventor: Yukinori Tsukamoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/544,642

(22) PCT Filed: Jan. 28, 2015

(86) PCT No.: PCT/JP2015/052291
§ 371 (c)(1),
(2) Date: Jul. 19, 2017

(87) PCT Pub. No.: WO2016/121022
PCT Pub. Date: Aug. 4, 2016

(65) Prior Publication Data
US 2018/0015837 A1    Jan. 18, 2018

(51) Int. Cl.
| B60L 11/18 | (2006.01) |
| H02J 50/90 | (2016.01) |
| H02J 50/10 | (2016.01) |

(52) U.S. Cl.
CPC ....... B60L 11/1833 (2013.01); B60L 11/1829 (2013.01); H02J 50/10 (2016.02); H02J 50/90 (2016.02); *B60L 11/182* (2013.01); *B60L 11/1838* (2013.01); *B60L 2240/12* (2013.01); *B60L 2240/62* (2013.01); *B60L 2250/16* (2013.01); *B60L 2250/24* (2013.01)

(58) Field of Classification Search
CPC ... B60L 11/1833; B60L 11/1829; H02J 50/90; H02J 50/10
See application file for complete search history.

(56) References Cited

U.S. PATENT DOCUMENTS

| 8,423,223 B2 | 4/2013 | Nakamura et al. |
| 9,073,442 B2 | 7/2015 | Ichikawa |
| 2012/0091959 A1 | 4/2012 | Martin et al. |
| 2012/0323423 A1 | 12/2012 | Nakamura et al. |
| 2013/0037365 A1 | 2/2013 | Ichikawa |
| 2013/0038715 A1 | 2/2013 | Ichikawa |
| 2015/0306966 A1 | 10/2015 | Ichikawa |

FOREIGN PATENT DOCUMENTS

| CN | 102803005 A | 11/2012 |
| JP | 2011-015549 A | 1/2011 |
| JP | 2011-254633 A | 12/2011 |
| JP | 2012-080770 A | 4/2012 |
| JP | 2012-188116 A | 10/2012 |
| JP | 2014-183621 A | 9/2014 |
| WO | WO 2011/132271 A1 | 10/2011 |

*Primary Examiner* — Basil T. Jos
(74) *Attorney, Agent, or Firm* — Foley & Lardner LLP

(57) ABSTRACT

A parking assistance device for aligning a vehicle coil (11) mounted on a bottom surface of a vehicle (10) with a ground coil (31) installed on a ground, detects a voltage of the vehicle coil (11), detects a change in the voltage detected, notifies a driver of first braking when the change in the voltage detected shifts from an increasing direction to a decreasing direction, and notifies the driver of second braking when the change in the voltage shifts from the decreasing direction to the increasing direction.

4 Claims, 6 Drawing Sheets

FIG. 4-A
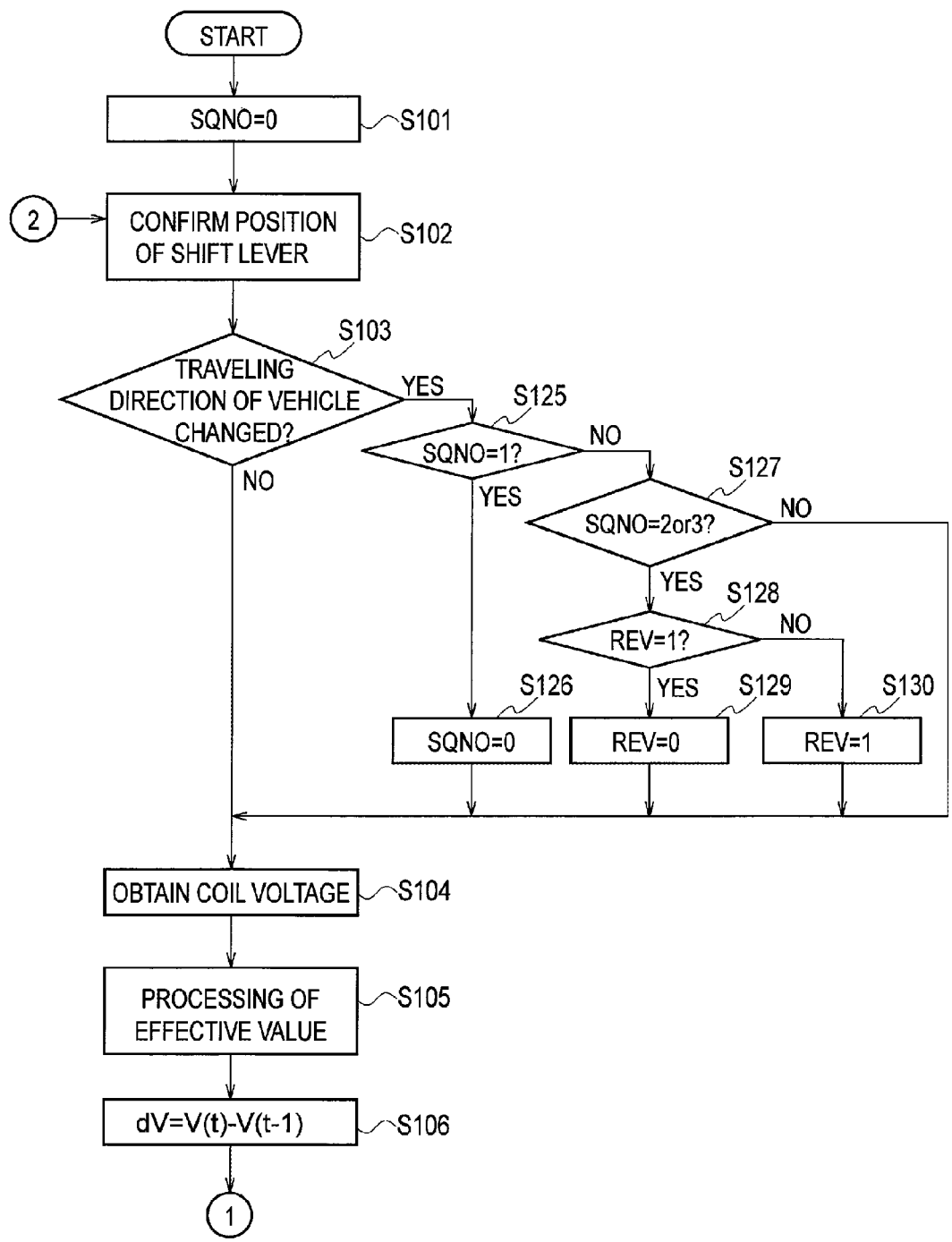

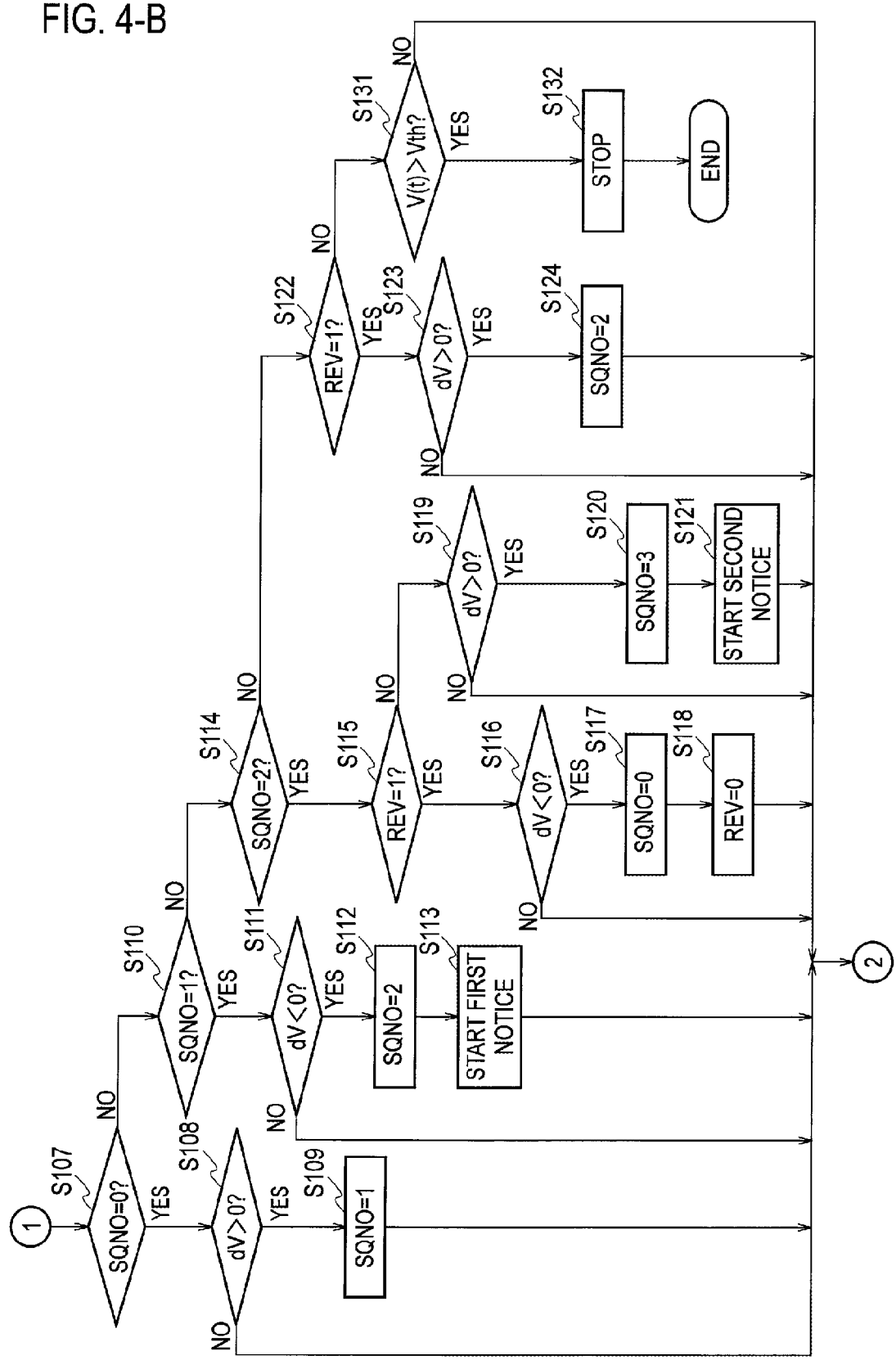
FIG. 4-B

PARKING ASSISTANCE DEVICE

TECHNICAL FIELD

The present invention relates to a parking assistance device for assisting in aligning a power receiving device on the vehicle side with a power transmission device on the ground side.

BACKGROUND ART

Wireless charging systems have been developed that charge batteries installed in vehicles such as electric vehicles and hybrid vehicles via a wireless connection without the use of plugs. Accurate alignment of power receiving devices on the vehicle side with power transmission devices on the ground side is important to implement efficient charging in such wireless charging systems. Patent Literature 1 describes a system for assisting in aligning a power receiving device on the vehicle side with a power transmission device on the ground side, the system using weak excitation to calculate a distance between the coils and displaying the result thus obtained.

CITATION LIST

Patent Literature

Patent Literature 1: Japanese Patent Application Publication No. 2011-015549

SUMMARY OF INVENTION

The result notified by the system described in Patent Literature 1, however, may confuse a driver as to which timing the driver should apply the brakes. As a result, the driver may overrun a stop point because of a delay in applying the brakes.

The present invention has been made in view of the above-described conventional problem. An object of the present invention is to provide a parking assistance device for assisting in braking operation in advance to improve accuracy of positioning of a vehicle.

A parking assistance device according to an aspect of the present invention detects a voltage of a vehicle coil, detects a change in the voltage detected, notifies a driver of first braking when the change in the voltage detected shifts from an increasing direction to a decreasing direction, and notifies the driver of second braking when the change in the voltage shifts from the decreasing direction to the increasing direction.

BRIEF DESCRIPTION OF DRAWINGS

FIG. 4-A is a flowchart illustrating a parking assistance operation implemented by the parking assistance device according to the first embodiment of the present invention.

FIG. 4-B is a flowchart illustrating the parking assistance operation implemented by the parking assistance device according to the first embodiment of the present invention.

DESCRIPTION OF EMBODIMENTS

Figure 1:
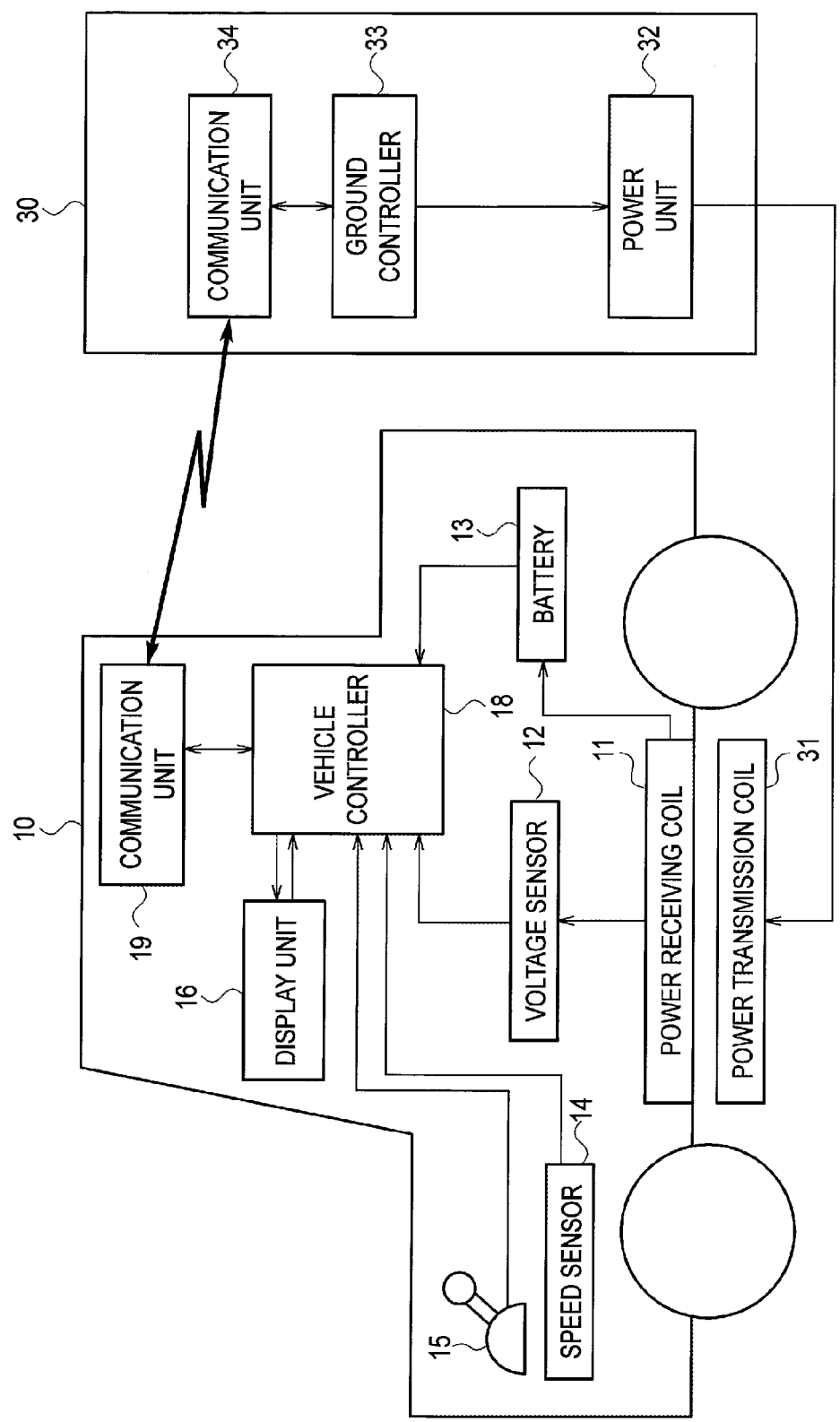
FIG. 1 is a configuration diagram showing an entire wireless charging system including a vehicle equipped with a parking assistance device according to a first embodiment of the present invention and a power supply device.

Embodiments of the present invention will be described below with reference to the drawings. The same elements in the descriptions of the drawings are designated by the same reference numerals, and explanations thereof are not repeated below.

First Embodiment

A configuration of a wireless charging system according to a first embodiment of the present invention is described below. As shown in FIG. 1, the wireless charging system includes a power supply device 30 placed in a power supply station or a parking space, for example, and a vehicle 10, and supplies electric power via a wireless connection from a power transmission coil 31 provided in the power supply device 30 to a power receiving coil 11 installed in the vehicle 10. More particularly, the wireless charging system conducts transmission and reception of high-frequency electric power between the power transmission coil 31 and the power receiving coil 11 in a wireless manner through electromagnetic induction. When a voltage is applied to the power transmission coil 31, a magnetic connection is caused between the power transmission coil 31 and the power receiving coil 11, so as to supply the electric power from the power transmission coil 31 to the power receiving coil 11. The power receiving coil 11 is arranged in the vehicle 10 so as to be aligned with the power transmission coil 31 when the vehicle 10 is parked at a predetermined position in a parking space.

The power supply device 30 includes a power unit 32 for supplying a current to excite the power transmission coil 31, a ground controller 33 for controlling the operation of the power unit 32, and a communication unit 34 for communicating with a communication unit 19 of the vehicle 10.

The vehicle 10 includes the power receiving coil 11 installed on the bottom surface, a voltage sensor 12 for detecting a voltage of the power receiving coil 11, and a battery 13 for storing electric power received. The vehicle 10 further includes a speed sensor 14 for detecting a speed of the vehicle 10, a shift lever 15, a display unit 16 for displaying and indicating various kinds of information to the driver, the communication unit 19 for communicating with the communication unit 34 of the power supply device 30, and a vehicle controller 18.

The display unit 16 is a vehicle navigation device, for example, for indicating pieces of information to the driver and accepting the operation of the driver.

The vehicle controller 18 receives signals from the voltage sensor 12, the battery 13, the speed sensor 14, and the shift lever 15, and controls the information displayed on the display unit 16. The vehicle controller 18 also transmits a test signal transmission request to the communication unit 34 through the communication unit 19 when the power receiving coil 11 installed in the vehicle 10 comes close to the power transmission coil 31. The ground controller 33 then detects the test signal transmission request and outputs a test signal to the transmission coil 31. The test signal may be a signal transmitted with the same electric power as in the case of power transmission after the start of charging, but is preferably a signal with weaker electric power than that at the time of regular power transmission. The weak excitation is then conducted from the power transmission coil 31 to the power receiving coil 11 by use of the test signal.

The ground controller 33 and the vehicle controller 18 may be an integrated computer including a central processing unit (CPU) and a storage medium such as a RAM, a ROM, or a hard disk. The power receiving coil 11 and the power transmission coil 31 may be of a disk type or a solenoid type.

Figure 2:
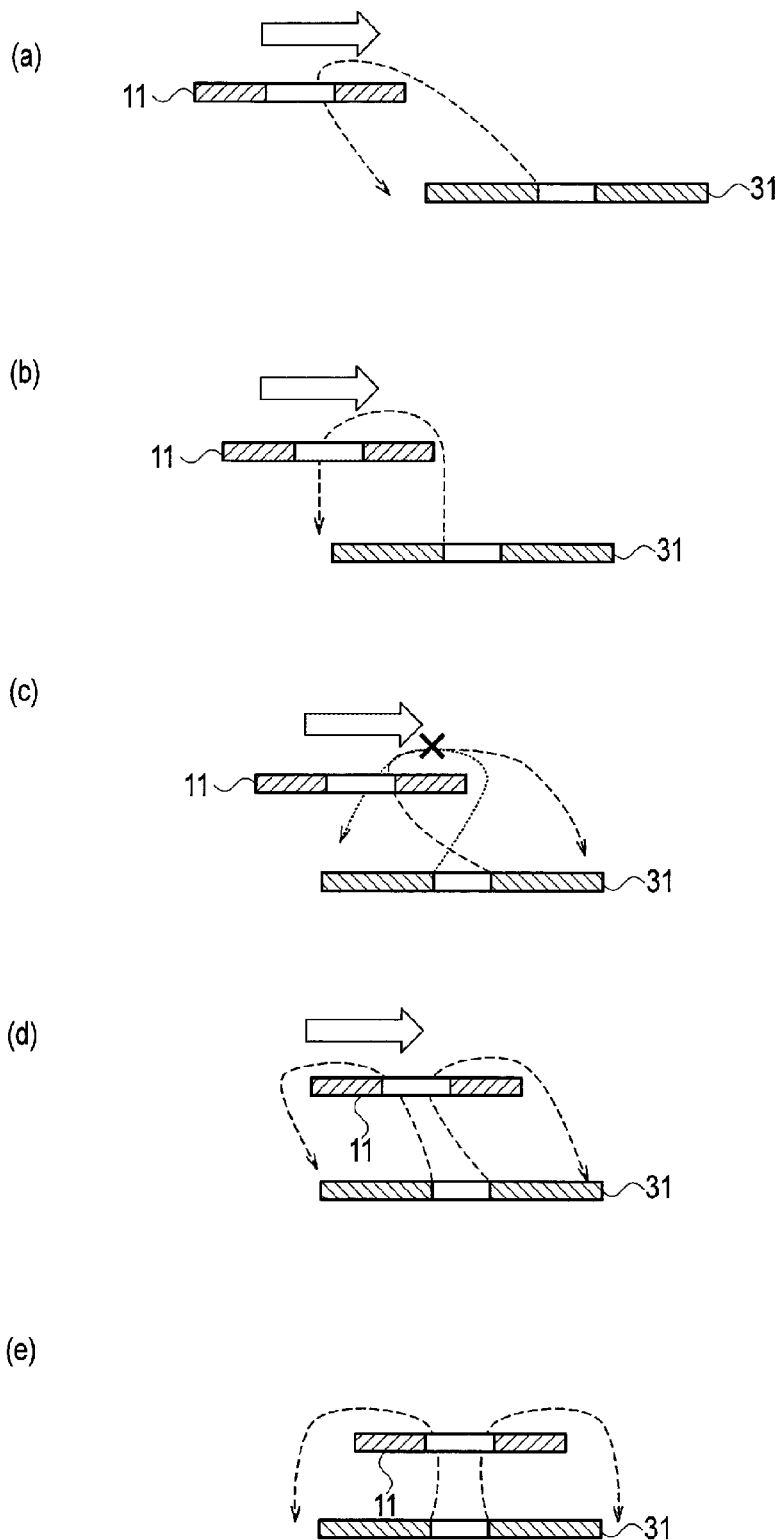
FIG. 2(a) to FIG. 2(e) are schematic views illustrating a positional relationship between a power receiving coil and a power transmission coil.

Next, a method of aligning the power receiving coil 11 with the power transmission coil 31 according to the present embodiment is described below with reference to FIG. 2 and FIG. 3. The vertical axis in FIG. 3 shows a voltage of the power receiving coil 11, and the horizontal axis shows a time.

Figure 3:
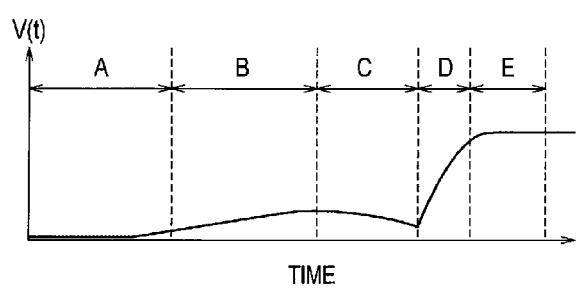
FIG. 3 is a graph showing a voltage of the power receiving coil varying as the power receiving coil comes closer to the power transmission coil.

As shown in FIG. 2(a) and indicated by the area A in FIG. 3, when the power receiving coil 11 comes close to the power transmission coil 31, magnetic flux output from the power transmission coil 31 penetrates the power receiving coil 11, so that a voltage is generated in the power receiving coil 11.

As shown in FIG. 2(b) and indicated by the area B in FIG. 3, when the power receiving coil 11 comes closer to the power transmission coil 31, the magnetic flux penetrating the power receiving coil 11 increases, and the voltage generated in the power receiving coil 11 also increases.

As shown in FIG. 2(c) and indicated by the area C in FIG. 3, when the power receiving coil 11 comes much closer to the power transmission coil 31, portions of the magnetic flux penetrating the power receiving coil 11 intersect to counteract each other to decrease the voltage generated in the power receiving coil 11.

As shown in FIG. 2(d) and indicated by the area D in FIG. 3, when the power receiving coil 11 comes much closer to the power transmission coil 31, the portions of the magnetic flux stop intersecting, so that the magnetic flux penetrating the power receiving coil 11 increases, and the voltage generated in the power receiving coil 11 greatly increases.

As shown in FIG. 2(e) and indicated by the area E in FIG. 3, when the power receiving coil 11 is directly opposed to the power transmission coil 31, the voltage generated in the power receiving coil 11 is maximized.

As described above, the change in the voltage generated in the power receiving coil 11 alternately shifts positively, negatively, and positively as the power receiving coil 11 comes closer to the power transmission coil 31. The present embodiment implements the positioning assistance by use of the change in the voltage. The positioning assistance controlled by the vehicle controller 18 is described in detail below with reference to the flowcharts shown in FIG. 4-A and FIG. 4-B. The process starts when the driver pushes a parking start button displayed on the display unit 16, for example. The flowcharts illustrate the case of reverse parking.

In step S101, the vehicle controller 18 sets the sequence number (SQNO) to zero. SQNO is an identification number used when the vehicle controller 18 carries out predetermined control.

In step S102, the vehicle controller 18 detects the position of the shift lever 15. The vehicle controller 18 sets REV to zero when the shift lever 15 is in the reverse range and sets REV to one when the shift lever 15 is in the drive range.

In step S103, the vehicle controller 18 determines whether the traveling direction of the vehicle 10 is changed according to the position of the shift lever 15 detected. The reason for determining the change of the traveling direction of the vehicle 10 is described in detail below. The following is the case in which the vehicle controller 18 determines that the traveling direction of the vehicle 10 is not changed, and the process proceeds to step S104.

In step S104, the vehicle controller 18 obtains the voltage of the power receiving coil 11 from the voltage sensor 12.

In step S105, the vehicle controller 18 converts the voltage of the power receiving coil 11 obtained into an effective value.

In step S106, the vehicle controller 18 calculates a change in the voltage (dV) of the power receiving coil 11 according to the following equation.

[Math 1]

$$dV=V(t)-V(t-1) \qquad (1)$$

In step S107, the vehicle controller 18 determines whether SQNO is zero (SQNO=0). The process proceeds to step S108 when SQNO is zero. The process proceeds to step S110 when SQNO is not zero.

In step S108, the vehicle controller 18 determines whether dV is greater than zero (dV>0). The process proceeds to step S109 when dV is greater than zero. The process returns to step S102 when dV is not greater than zero. The determination that dV is greater than zero in step S108 denotes that the voltage of the power receiving coil 11 is increasing. In other words, the change in the voltage (dV) greater than zero denotes that the power receiving coil 11 comes close to the power transmission coil 31 as shown in FIG. 2(b) and indicated by the area B in FIG. 3. Thus, in step S109, the vehicle controller 18 recognizes that the process is at the immediately previous stage for notifying the driver of information, so as to set SQNO to one.

In step S110, the vehicle controller 18 determines whether SQNO is one (SQNO=1). The process proceeds to step S111 when SQNO is one. The process proceeds to step S114 when SQNO is not one.

In step S111, the vehicle controller 18 determines whether dV is less than zero (dV<0). The process proceeds to step S112 when dV is less than zero. The process returns to step S102 when dV is not less than zero. The determination that dV is less than zero in step S111 denotes that the change in the voltage of the power receiving coil 11 shifts from the increasing direction to the decreasing direction. In other words, the change in the voltage (dV) less than zero in step S111 denotes that the power receiving coil 11 comes closer to the power transmission coil 31 as shown in FIG. 2(c) and indicated by the area C in FIG. 3. The vehicle controller 18 then sets SQNO to two in step S112.

In step S113, since SQNO is set to two, the vehicle controller 18 starts informing the driver of the first notice. The first notice is to urge the driver to decelerate the vehicle, for example. More particularly, the vehicle controller 18 directs the display unit 16 to display the notice "Please start decelerating to align the coils with each other" so as to urge the driver to decelerate the vehicle. Accordingly, the driver can realize the timing of applying the brakes.

In step S114, the vehicle controller 18 determines whether SQNO is two (SQNO=2). The process proceeds to step S115 when SQNO is two. The process proceeds to step S122 when SQNO is not two.

In step S115, the vehicle controller 18 determines whether REV is one (REV=1). The process proceeds to step S116 when REV is one. The process proceeds to step S119 when SQNO is not one. The case that the process proceeds to step S119 is described first, and the case that the process proceeds to step S116 is described afterward.

In step S119, the vehicle controller 18 determines whether dV is greater than zero (dV>0). The process proceeds to step S120 when dV is greater than zero. The process returns to step S102 when dV is not greater than zero. The determination that dV is greater than zero in step S119 denotes that the change in the voltage of the power receiving coil 11 shifts from the decreasing direction to the increasing direction. In other words, the change in the voltage (dV) greater than zero in step S119 denotes that the power receiving coil 11 comes closer to the power transmission coil 31 as shown in FIG. 2(d) and indicated by the area D in FIG. 3. The vehicle controller 18 then sets SQNO to three in step S120.

In step S121, since SQNO is set to three, the vehicle controller 18 starts informing the driver of the second notice. The second notice is to urge the driver to apply the brakes more strongly than the deceleration in the first notice, for example. More particularly, the vehicle controller 18 directs the display unit 16 to display the notice "Please decelerate strongly to align the coils with each other" so as to urge the driver to decelerate the vehicle. Accordingly, the driver can realize the timing of applying the brakes.

The reason for determining the change of the traveling direction of the vehicle 10 in step S103 is described in detail. The driver frequently changes the traveling direction of the vehicle upon parking by turning the steering wheel while operating the shift lever. In such a case, the positional relationship shown in FIG. 2(c) may change to the positional relationship shown in FIG. 2(b). In other words, the vehicle 10 may move in the direction in which the power receiving coil 11 is leaving the power transmission coil 31. The change in the voltage of the power receiving coil 11 thus shifts from the decreasing direction to the increasing direction. However, the vehicle controller 18 should be prevented from informing the driver of the second notice, since the power receiving coil 11 is separated from the power transmission coil 31. The notice can be stopped such that the change in the voltage of the power receiving coil 11 when the traveling direction is changed is reset. When the traveling direction is changed again after the change in the voltage of the power receiving coil 11 is reset, the vehicle controller 18 starts control of informing the driver of the next notice based on the change in the voltage. This is the reason that the vehicle controller 18 determines whether the traveling direction is changed in step S103.

The following is the case in which the vehicle controller 18 determines that the traveling direction of the vehicle 10 is changed, and the process proceeds to step S125. In step S125, the vehicle controller 18 determines whether SQNO is one (SQNO=1). The process proceeds to step S126 when SQNO is one. The process proceeds to step S127 when SQNO is not one.

In step S126, the vehicle controller 18 sets SQNO to zero. The change in the voltage of the power receiving coil 11 is thus reset.

In step S127, the vehicle controller 18 determines whether SQNO is two or three (SQNO=2 or 3). The process proceeds to step S128 when SQNO is two or three. The process proceeds to step S104 when SQNO is not either two or three but zero.

In step S128, the vehicle controller 18 determines whether REV is one (REV=1). The process proceeds to step S129 when REV is one, and the vehicle controller 18 sets REV to zero. The process proceeds to step S130 when REV is not one, and the vehicle controller 18 sets REV to one.

The following is the case in which the process proceeds to step S116 from step S115. In step S116, the vehicle controller 18 determines whether dV is less than zero (dV<0). The process proceeds to step S117 when dV is less than zero. The process returns to step S102 when dV is not less than zero.

In step S117, the vehicle controller 18 sets SQNO to zero. In step S118, the vehicle controller 18 sets REV to zero. The change in the voltage of the power receiving coil 11 is thus reset.

In step S122, the vehicle controller 18 determines whether REV is one (REV=1). The process proceeds to step S123 when REV is one. The process proceeds to step S131 when REV is not one.

In step S123, the vehicle controller 18 determines whether dV is greater than zero (dV>0). The process proceeds to step S124 when dV is greater than zero. The process returns to step S102 when dV is not greater than zero.

In step S124, the vehicle controller 18 sets SQNO to two. The change in the voltage of the power receiving coil 11 is thus reset.

In step S131, the vehicle controller 18 determines whether V(t) is greater than Vth (V(t)>Vth). Vth is a threshold for determining whether the vehicle 10 is located in a predetermined position, namely, whether the power receiving coil 11 is directly opposed to the power transmission coil 31. The process proceeds to step S132 when V(t) is greater than Vth. The process returns to step S102 when V(t) is not greater than Vth.

In step S132, the vehicle controller 18 directs the display unit 16 to indicate that the driver should stop the vehicle 10. The driver can immediately stop the vehicle 10, since the driver has recognized that the power receiving coil 11 is coming closer to the power transmission coil 31 due to the first notice and the second notice and has started decelerating the vehicle 10.

As described above, the parking assistance device according to the first embodiment determines whether the power receiving coil 11 comes close to the power transmission coil 31 depending on the change in the voltage of the power receiving coil 11, and informs the driver of the notice based on the determination result. In particular, the parking assistance device informs the driver of the first notice when the change in the voltage of the power receiving coil 11 shifts from the increasing direction to the decreasing direction so as to urge the driver to decelerate the vehicle. Subsequently, the parking assistance device informs the driver of the second notice when the change in the voltage of the power receiving coil 11 shifts from the decreasing direction to the increasing direction so as to urge the driver to further decelerate the vehicle. Accordingly, the driver can easily recognize the timing of braking, so as to prevent overrun or insufficient approach upon positioning between the power receiving coil 11 and the power transmission coil 31.

The parking assistance device according to the first embodiment resets the change in the voltage of the power receiving coil 11 according to the information of the position of the shift lever, so as to inform the driver of an appropriate timing of deceleration upon parking while the driver is changing the traveling direction of the vehicle.

Although the first embodiment exemplified the first notice and the second notice displayed on the display unit 16, the vehicle controller 18 may inform the driver of these notices through voice instructions. Although the first embodiment exemplified the first notice for urging the driver to apply the brakes lightly and the second notice for urging the driver to apply the brakes strongly, the respective notices are not limited thereto, and the degrees of deceleration urged by the first notice and the second notice may be the same. The first notice may be used for preparing the driver for deceleration, and the second notice may be used for urging the driver to apply the brakes. The first notice may be used for urging the driver to decelerate the vehicle to the first speed, and the second notice may be used for urging the driver to decelerate the vehicle to the second speed different from the first speed. When the vehicle has an autonomous driving mode, the first notice may be used for preparing the driver for deceleration, and the second notice may be used for automatically decelerating while urging the driver to applying the brakes.

The present embodiment illustrates the case of reverse parking, but may also be applicable to forward parking or parallel parking.

Second Embodiment

Figure 5:
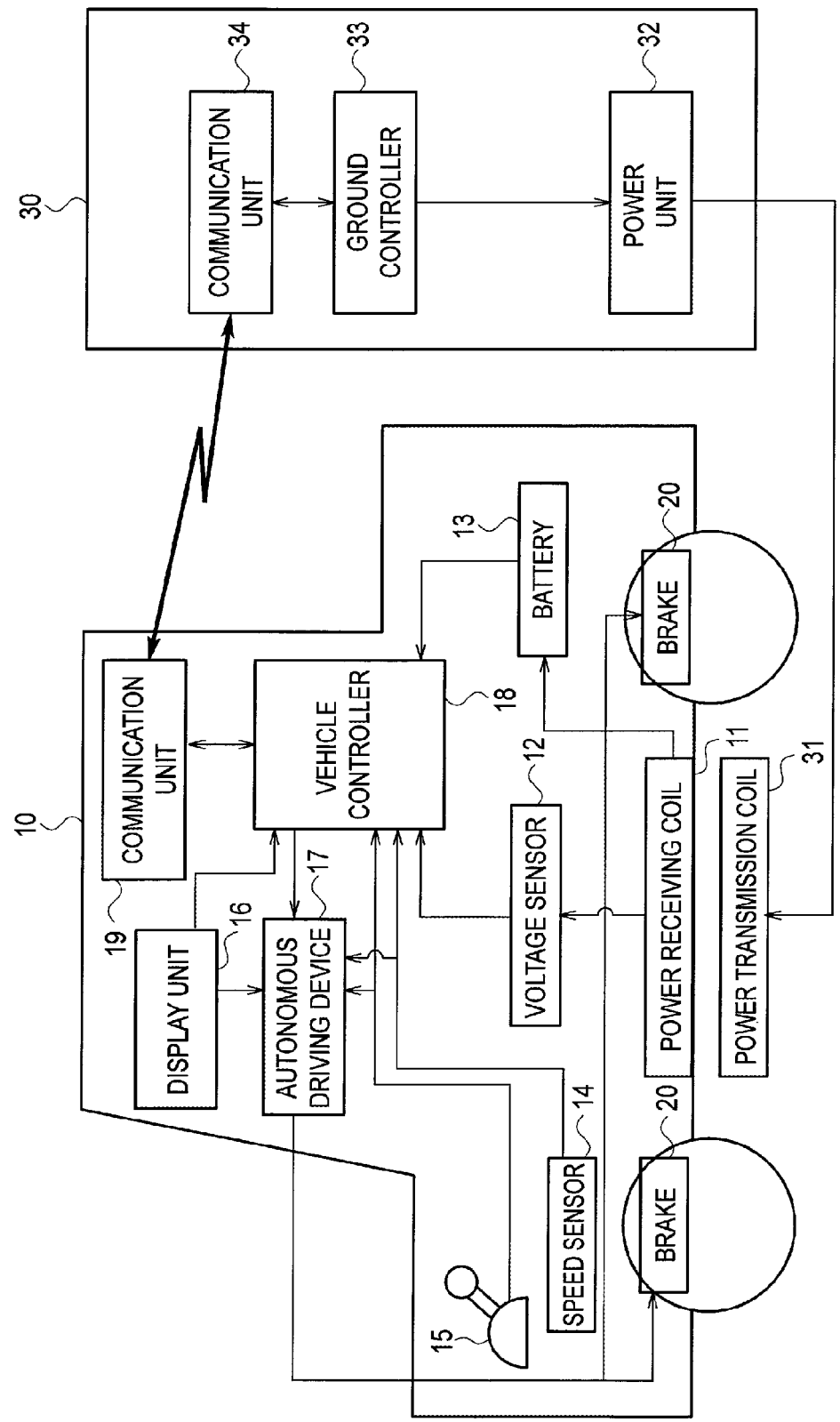
FIG. 5 is a configuration diagram showing an entire wireless charging system including a vehicle equipped with a parking assistance device according to a second embodiment of the present invention and a power supply device.

A second embodiment is described below with reference to FIG. 5. The second embodiment differs from the first embodiment in that the vehicle 10 according to the second embodiment includes an autonomous driving device 17. The same elements as those in the first embodiment are designated by the same reference numerals, and detail explanations thereof are not repeated below.

The autonomous driving device 17 implements autonomous driving control of the vehicle based on traveling conditions of the vehicle and information on the outside of the vehicle, and controls the brakes 20 and an accelerator (not shown). The driver can choose the autonomous driving through autonomous/manual driving optional buttons displayed on the display unit 16. When the autonomous driving button is chosen, the autonomous driving device 17 starts parking autonomously.

The autonomous driving device 17 may include a database including maps and traffic information, devices such as a camera and a radar sensor for acquiring external information of the vehicle, and a traveling controller for controlling various types of actuators according to the database and the information acquired by the devices.

The process of assisting in positioning during autonomous parking is substantially the same as that described in the first embodiment with reference to the flowcharts shown in FIG. 4-A and FIG. 4-B, but differs in the processing of step S113, step S121, and step S132. The different steps are described below.

In step S113, the autonomous driving device 17 autonomously activates the brakes 20 with the first braking force to decelerate the vehicle 10.

In step S121, the autonomous driving device 17 autonomously activates the brakes 20 with the second braking force stronger than the first braking force to decelerate the vehicle 10.

In step S132, the autonomous driving device 17 stops the vehicle 10.

As described above, the parking assistance device according to the second embodiment determines whether the power receiving coil 11 comes close to the power transmission coil 31 depending on the change in the voltage of the power receiving coil 11, and autonomously controls the vehicle based on the determination result. In particular, the parking assistance device decelerates the vehicle 10 with the first braking force when the change in the voltage of the power receiving coil 11 shifts from the increasing direction to the decreasing direction. Subsequently, the parking assistance device decelerates the vehicle 10 with the second braking force stronger than the first braking force when the change in the voltage of the power receiving coil 11 shifts from the decreasing direction to the increasing direction. Accordingly, the parking assistance device can easily recognize the timing of braking, so as to prevent overrun or insufficient approach upon positioning between the power receiving coil 11 and the power transmission coil 31.

The parking assistance device according to the second embodiment resets the change in the voltage of the power receiving coil 11 according to the information of the position of the shift lever, so as to accurately recognize the timing of braking upon parking while changing the traveling direction of the vehicle for avoiding obstacles.

Although the second embodiment exemplified the control implemented by the autonomous driving device 17 by use of the first braking force and the second braking force stronger than the first braking force, the degrees of the first braking force and the second braking force may be the same. Alternatively, the autonomous driving device 17 may decelerate the vehicle 10 to the first speed without the use of the first braking force, and decelerate the vehicle 10 to the second speed less than the first speed without the use of the second braking force.

While the embodiments of the present invention have been described above, it should be understood that the present invention is not intended to be limited to the descriptions and the drawings composing part of this disclosure. Various alternative embodiments, examples, and technical applications will be apparent to those skilled in the art according to this disclosure.

REFERENCE SIGNS LIST

10 VEHICLE
11 POWER RECEIVING COIL
12 VOLTAGE SENSOR
17 AUTONOMOUS DRIVING DEVICE
18 VEHICLE CONTROLLER
31 POWER TRANSMISSION COIL

The invention claimed is:

1. A parking assistance device for aligning a vehicle coil mounted on a bottom surface of a vehicle with a ground coil installed on a ground, the parking assistance device comprising:
  a voltage sensor configured to detect a voltage of the vehicle coil;
  a rate-of-change detector configured to detect a change in the voltage detected by the voltage sensor; and
  a notifying controller configured to notify a driver of first braking when the change in the voltage detected by the rate-of-change detector shifts from an increasing direction to a decreasing direction, and notify the driver of second braking when the change in the voltage shifts from the decreasing direction to the increasing direction.

2. The parking assistance device according to claim 1, wherein the notifying controller detects a position of a shift lever and resets the change in the voltage when the position of the shift lever detected is changed.

3. A parking assistance device for aligning a vehicle coil mounted on a bottom surface of a vehicle with a ground coil installed on a ground, the parking assistance device comprising:
  a voltage sensor configured to detect a voltage of the vehicle coil;
  a rate-of-change detector configured to detect a change in the voltage detected by the voltage sensor; and an autonomous driving controller configured to implement first autonomous braking when the change in the voltage detected by the rate-of-change detector shifts from an increasing direction to a decreasing direction, and implement second autonomous braking when the change in the voltage shifts from the decreasing direction to the increasing direction.

4. The parking assistance device according to claim 3, wherein the autonomous driving controller detects a position of a shift lever and resets the change in the voltage when the position of the shift lever detected is changed.

* * * * *